Patented Oct. 12, 1937

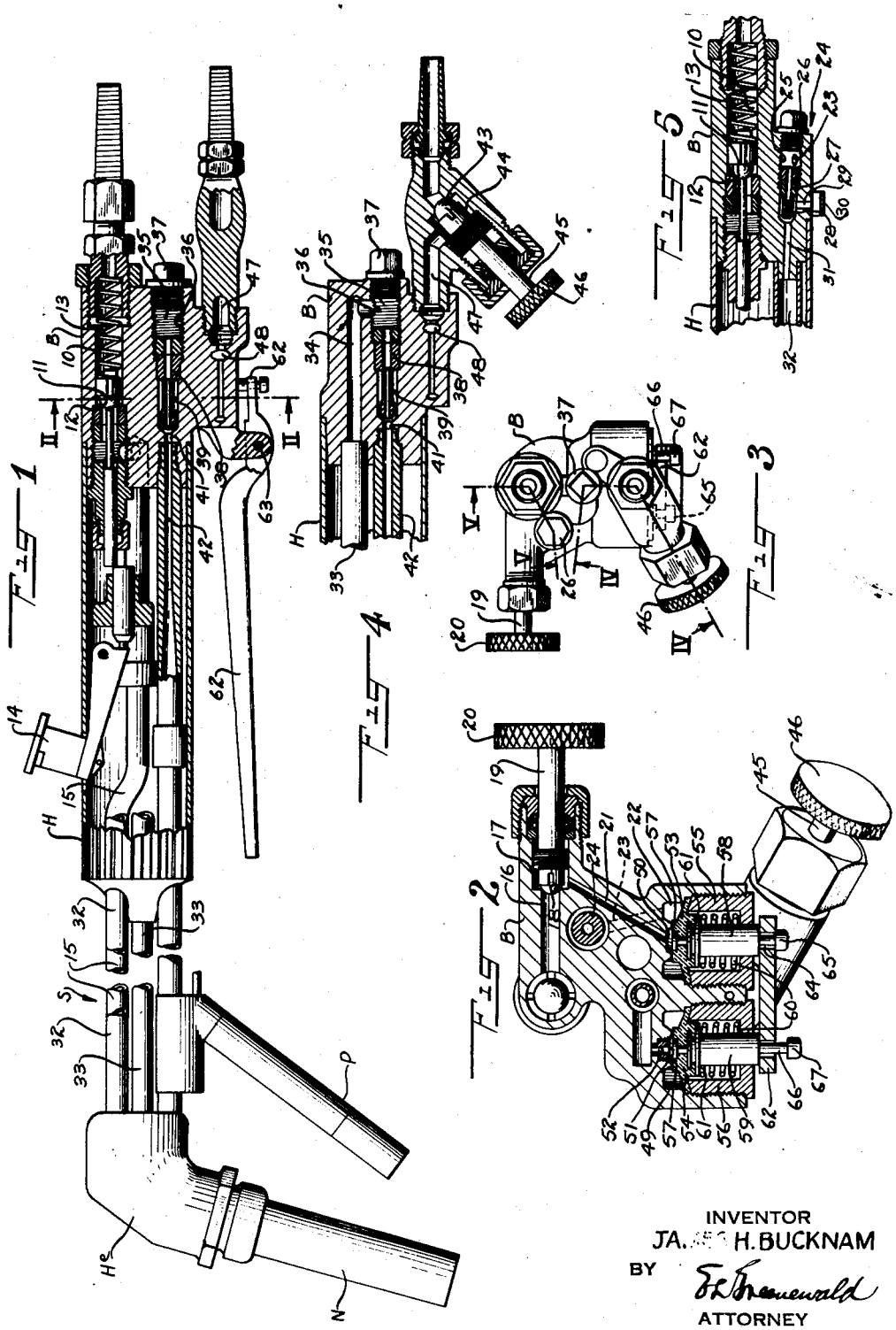

2,095,789

UNITED STATES PATENT OFFICE 2,095,789

VALVE ASSEMBLY

James H. Bucknam, Cranford, N. J., assignor, by mesne assignments, to Union Carbide and Carbon Corporation, a corporation of New York Application September 6, 1934, Serial No. 742,929

17 Claims. (Cl. 277—3)

This invention relates to valves for controlling the flow of fluids and more particularly groups of valves which may be operated in concert to admit a plurality of fluids to an apparatus where they may be mixed, combined or otherwise acted upon simultaneously. The invention is particularly useful in connection with blowpipes wherein oxygen is mixed with a fuel-gas to form a combustible mixture, and wherein under certain conditions either the oxygen or the fuel-gas may be first mixed with air. However, the invention is not limited to this use.

In using some fluids, conservation of the fluid is an important consideration, and it becomes essential that the fluid supply be shut off at all times when not in use. Furthermore, with such fluids, it is also necessary to use the fluid at all times in an economical manner. These considerations are particularly relevant to the use of fuel gases, such as acetylene, in a blowpipe.

One object of the invention therefore, is gas economy. Another object is the provision of an apparatus wherein the relative proportions of the gases may be easily adjusted, wherein the volume of the gases may be conveniently regulated while maintaining the desired proportions, and wherein the valves will close automatically upon release of the operating mechanism. A further object is the provision of a simple valve assembly of the character described, in compact form, which will make possible its incorporation in apparatus wherein limited space is available, and which will permit it to be used conveniently with associated or coacting parts of the apparatus. Other objects will appear upon consideration of the present specification.

The invention is shown by way of illustration, as embodied in a blowpipe, in the accompanying drawing, in which;

Fig. 1 is a broken longitudinal elevation, partly in section, of a blowpipe constructed in accordance with the invention, Fig. 2 is a cross-section on line II—II of Fig. 1, Fig. 3 is an end view of the blowpipe as seen from the right in Fig. 1, Fig. 4 is a partial longitudinal section taken on the line IV—IV of Fig. 3, and Fig. 5 is a partial longitudinal section taken on the line V—V of Fig. 3.

According to the present invention a valve assembly is provided for controlling the admission of fluids to a mixer so that the supply may be instantly shut off when the mixture is not in use, and so that during use economy of fluid may be assured.

In the embodiment illustrated in the drawing there is shown a blowpipe comprising a handle H, having a valve body B attached thereto at its rear end, and being connected with a blowpipe head H$^c$ at its forward end by means of a stem S. A nozzle N extends in continuation of the head H$^e$, preferably at an angle to the stem; and a lighter P is carried by the stem S in a position to project a flame in front of the nozzle N.

Oxygen, under pressure, is admitted in any known or convenient manner to a chamber 10 in the valve body B. A valve 11 in the chamber, held upon a seat 12 by a helical spring 13, is lifted from its seat by pressure upon a button 14 extending externally from the handle H to admit cutting oxygen to a tube 15 in communication with the nozzle N, all in a manner forming no part of the present invention.

Heating oxygen also passes through the chamber 10. Thus, an oxygen passage 16 in the valve body B connects the chamber 10 with a valve chamber 17 in the valve body. A throttle valve 18, actuated by a threaded stem 19, having an external knurled head 20 thereon, seats upon the end of the oxygen passage 16 and admits, restricts or shuts off the supply of heating oxygen to the valve chamber 17. A duct 21 extends through the valve body from the valve chamber 17 to the entrance of an oxygen valve chamber 22 forming a part of the valve assembly to which this invention is particularly directed. A detailed description of this valve assembly will be given at a subsequent point in this specification.

A duct 23 in the valve body B extends from the oxygen valve chamber 22 to the entrance side of an oxygen-air mixer 24. The oxygen-air mixer comprises an, internally threaded bore 25 in the valve body B, the bore being closed by a threaded plug 26, and having therein, spaced from the plug, an axially bored injector nozzle 27. The forward end of the nozzle clears the bore to form an annular aspirating chamber 28, and a port 29, shielded by a guard 30, permits air to enter the aspirating chamber freely. A throat 31, in the valve block B, connects the aspirating chamber with an oxygen-air tube 32 in the handle. The throat 31 is preferably substantially coaxial with the bore through the injector nozzle, and of greater diameter than that bore. Thus, oxygen under pressure projected from the end of the nozzle 27, enters the throat 31 with considerable velocity, carrying with it air from the aspirating chamber 28 and thereby reducing the pressure in the aspirating chamber and causing air to enter through the port 29. The oxygen and air mix in the throat 31 and pass into the oxygen-air tube 32, which extends from the valve body B to the blowpipe head H°. The oxygen-air mixture returns from the head H° to the valve body B through a second oxygen-air tube 33.

The end of the oxygen-air tube 33 which is distant from the head H° is connected into the valve body B, and discharges into a passage 34 in the valve body, which carries the oxygen-air mixture to the intake end of an oxygen-air-fuel gas mixer 35. The mixer 35 comprises an internally threaded cavity 36 closed by a threaded plug 37 and fitted with an axially bored oxygen-air nozzle 38 spaced from the plug. The forward end of the nozzle, when the latter is in position, clears the end of the cavity, and is of smaller diameter than the cavity, thereby providing an annular aspirating chamber 39 surrounding the nozzle end. Fuel-gas is admitted to the aspirating chamber 39 through a bore 40 in a manner later to be described. A throat 41, substantially coaxial with the bore in the oxygen-air nozzle 38, extends from the aspirating chamber 39 into an oxygen-air-fuel gas delivery pipe 42 which passes through the handle and the stem to the head H° whence it delivers a combustible mixture of oxygen, air and fuel-gas to the nozzle N.

The entrance of fuel-gas to the blowpipe is controlled by a throttle valve 43, operated in a valve chamber 44 by a threaded valve stem 45, having a knurled head 46 at its external end. A passage 47 leads from the valve chamber 44 to a duct 48 which connects with the entrance end of a fuel-gas chamber 49.

As has already been stated the oxygen and the fuel-gas are led to valve chambers 22 and 49 respectively, forming a part of the valve assembly to which this invention is particularly directed.

This valve assembly comprises the oxygen valve chamber 22 and the fuel-gas valve chamber 49 formed in the valve body B, an inlet 50 for the oxygen valve chamber, a raised annular lip surrounding the inlet 50, an outlet 51 for the fuel-gas valve chamber, a raised annular lip surrounding the outlet 51 formed integrally in the valve body B, together with valves and associated parts in and adjacent the valve chambers. The outlet 51 of the fuel-gas valve chamber is internally threaded, and a metering plug 52 is screwed into the nozzle to govern the rate of fuel-gas travel out of the valve chamber. The valves themselves are shutoff valves and are preferably rubber diaphragms 53 and 54 having their edges confined by hollow nuts 55 and 56 screwed into the oxygen chamber 22 and the fuel-gas chamber 49 respectively. Each diaphragm has a seating portion 57 of resilient material integral therewith, and both the diaphragm and the seating portion of each valve are vulcanized to one end of an oxygen valve stem 58 or a fuel-gas valve stem 59 as the case may be. The seating portion is therefore carried by the valve stem in each instance. Each valve stem extends through the corresponding hollow nut, and springs 60, compressed between the outer ends of the hollow nuts and shoulders 61 on the valve stems normally retain the valves on their seats.

A single lever 62 pivoted to the blowpipe as at 63, coacts with the valve stems 58 and 59 for opening the valves. For this purpose the outer end of the oxygen valve stem 58 is formed as a neck 64 and has a head 65 at its end, and the outer end of the fuel-gas valve stem is formed as a neck 66 and has a head 67 at its end. The short end of the lever 62 fits around the necks 64 and 66, (by having forked ends or otherwise), and when the long end of the lever is pulled toward the blowpipe, as by gripping it with the hand, the short end of the lever 62 pulls on the heads 65 and 67 and opens the valves 53 and 54 against the action of the springs 60.

The neck 66 formed on the stem 59 of the fuel-gas valve stem may be longer than that on the oxygen valve stem 58 in order that the oxygen valve may always be opened automatically before the fuel-gas valve is opened, and in order that the fuel-gas valve may be permitted to close before the oxygen valve. With such a construction, a suction is produced in the oxygen-air-fuel-gas mixer 35 before the fuel-gas reaches that point and thereby the fuel-gas is prevented from escaping through the air port 29 in the oxygen-air mixer 24, or being mixed with the oxygen and air back of the oxygen-air injector nozzle 38.

From the foregoing description the operation of the apparatus will be clear. Heating oxygen, passing through the oxygen-air mixer 24, aspirates and mixes with air. The mixture then passes, in sequence, through the long tubes 32 and 33, in which any flash-backs will be extinguished before they can reach the air port 29, should any fuel-gas get into these passages. The oxygen-air mixture then enters the oxygen-air-fuel-gas mixer 35 where it aspirates fuel-gas which comes to the mixer under lower pressure. Because of the shape of the nozzle 38 in the oxygen-air-fuel-gas mixer, the fact that the oxygen-air mixture tends to create a vacuum in the aspirating chamber 39, and the fact that the fuel-gas enters the aspirating chamber at a pressure lower than that of the oxygen-air mixture, the fuel-gas cannot normally back up into the oxygen-air passages.

Since the fuel-gas metering plug 52 fixes the flow of the fuel-gas for a given pressure in the fuel-gas delivery line, the fuel-gas control valve 43 is opened wide, and a flame of proper characteristics is obtained by adjusting only the heating oxygen valve 18. Adjustment of the apparatus is accordingly made by opening fully the fuel-gas control valve 43, pulling the lever 62 as close to the handle H as possible, and then turning the heating oxygen valve head 20 until a flame of proper length and stability is obtained. Thereafter the volume of flame issuing from the nozle N is controlled by the position of the lever 62, but the proportions of oxygen, air and fuel-gas remain constant.

Release of the lever 62 extinguishes the flame.

Different metering plugs may be used for different types of service for which the blowpipe may be used, and for different fuel-gases.

The example here illustrated, and the particular description given, are presented merely to indicate how the invention may be applied. Other forms of the invention, consonant with the principles here set forth and coming within the proper scope of the appended claims, will of course, suggest themselves to those skilled in the art.

I claim:

1. A valve assembly for controlling the admission of fluids to a mixer, said valve assembly comprising a body having a plurality of valve chambers formed therein, a raised annular lip surrounding the outlet of one valve chamber, a raised annular lip surrounding the inlet of the other valve chamber, a valve in each valve chamber, a valve stem for each valve, a seating portion of each valve carried by its valve stem, and a single lever coacting with said valve stems for operating all valves.

2. A valve assembly for controlling the admission of fluids to a mixer, said valve assembly comprising a body having a plurality of valve chambers formed therein, a raised annular lip surrounding the outlet of one valve chamber, a raised annular lip surrounding the inlet of the other valve chamber, a valve in each valve chamber, a valve stem for each valve, a seating portion of each valve carried by its valve stem, a single lever coacting with said valve stems for opening all valves, and independent spring means associated with each valve for closing said valve upon release of said lever.

3. A valve assembly for controlling the admission of fluids to a mixer, said valve assembly comprising a body having two valve chambers formed therein, a raised annular lip surrounding the outlet of one valve chamber, a raised annular lip surrounding the inlet of the other valve chamber, a valve comprising a diaphragm in each valve chamber, a seating portion of resilient material integral with said diaphragm, a valve stem for each valve, a single lever coacting with said valve stems for opening said valves, and independent spring means associated with each valve for closing said valve upon release of said lever.

4. A valve assembly for controlling the admission of fluids to a mixer, said valve assembly comprising a body having two valve chambers formed therein, a raised annular lip surrounding the outlet of one valve chamber, a raised annular lip surrounding the inlet of the other valve chamber, a valve comprising a diaphragm in each valve chamber, a rubber valve seating portion integral with said diaphragm, a valve stem for each valve to which valve stem said diaphragm and said valve seating portion are vulcanized, a single lever coacting with said valve stems for opening said valves, and independent spring means associated with each valve for closing said valve upon release of said lever.

5. A valve assembly for controlling the admission of fluids to a mixer, said valve assembly comprising a body having two valve chambers formed therein, a raised annular lip surrounding the outlet of one valve chamber, a raised annular lip surrounding the inlet of the other valve chamber, a valve in each valve chamber, a valve stem for each valve, a seating portion of each valve, said seating portion being vulcanized to said valve stem, a single lever coacting with said valve stems for opening said valves, and independent spring means associated with each valve for closing said valve upon release of said lever.

6. A valve assembly for controlling the admission of fluids to a mixer, said valve assembly comprising a body having two valve chambers formed therein, a raised annular lip surrounding the outlet of one valve chamber, a raised annular lip surrounding the inlet of the other valve chamber, a valve in each chamber, a valve stem for each valve having a button on the outer end thereof, a seating portion of each valve carried by its valve stem, a single lever having forked ends engaging the buttons on said valve stems for opening all valves, and independent spring means associated with each valve for closing said valves upon release of said lever.

7. In a blowpipe, a valve body having two chambers, an oxygen inlet to one chamber in said valve body, a fuel-gas inlet to the other chamber, a raised annular lip surrounding the outlet of the fuel gas valve chamber, a raised annular lip surrounding the inlet of the oxygen valve chamber, a valve in each chamber, independent spring means for closing each valve, and a single means for opening both valves against the action of said spring means.

8. In a blowpipe, a valve body having two chambers, an oxygen inlet to one chamber in said valve body, a fuel-gas inlet to the other chamber, a raised annular lip surrounding the outlet of the fuel gas valve chamber, a raised annular lip surrounding the inlet of the oxygen valve chamber, a metering plug in the fuel-gas outlet, a valve in each chamber, independent spring means for closing each valve, and a single means for opening both valves against the action of said spring means.

9. In a blowpipe, a valve body having two chambers, one for oxygen and one for fuel gas, said fuel gas chamber having a single outlet, a metering plug in the fuel-gas outlet, a valve in each chamber for controlling the flow of gas to the outlet of the chamber, independent spring means for closing each valve, and a single means for opening both valves against the action of the respective spring means.

10. In a blowpipe, a valve assembly comprising a body having an oxygen valve chamber and a fuel-gas valve chamber formed therein; a raised annular lip surrounding the outlet of the fuel gas valve chamber formed integrally in said body; a raised annular lip surrounding the inlet of the oxygen valve chamber formed integrally in said body; a valve in each valve chamber; a valve stem for each valve having a neck terminating in a button at the outer end thereof; a seating portion of each valve carried by its valve stem; a single lever having a forked end about the neck of each valve stem adapted to bear upon the button at the outer end thereof for opening the valves; and independent spring means associated with each valve for closing said valves upon release of said lever.

11. In a blowpipe, a valve assembly comprising a body having an oxygen valve chamber and a fuel-gas chamber formed therein; a raised annular lip surrounding the outlet of the fuel gas valve chamber formed integrally in said body; a raised annular lip surrounding the inlet of the oxygen valve chamber formed integrally in said body; a valve comprising a diaphragm in each valve chamber; a rubber valve seating portion integral with said diaphragm, a valve stem for each valve to which valve stem said diaphragm and said valve seating portion are vulcanized, said valve stem having a neck terminating in a button at the outer end thereof, a single lever having a forked end about the neck to each valve stem adapted to bear upon the button at the outer end thereof for opening the valves, and independent spring means associated with each valve for closing said valves upon release of said lever.

12. In a blowpipe, a valve assembly comprising a body having an oxygen valve chamber and a fuel-gas chamber formed therein; a raised annular lip surrounding the outlet of the fuel gas valve chamber formed integrally in said body, a raised annular lip surrounding the inlet of the oxygen valve chamber formed integrally in said body, a metering plug in the outlet of the fuel-gas valve chamber; a valve comprising a diaphragm in each valve chamber; a rubber valve seating portion integral with said diaphragm, a valve stem for each valve to which valve stem said diaphragm and said valve seating portion are vulcanized, said valve stem having a neck terminating in a button at the outer end thereof, a single lever having a forked end about the neck to each valve stem adapted to bear upon the button at the outer end thereof for opening the valves, and independent spring means associated with each valve for closing said valves upon release of said lever, substantially as described.

13. A valve assembly for controlling the admission of fluids to a mixer, said valve assembly comprising a body having two valve chambers formed therein, a valve comprising a diaphragm in each valve chamber, a seating portion of resilient material integral with each diaphragm, the seating portion of one diaphragm being positioned opposite to and adapted to close the exit from one valve chamber and the seating portion of the other valve being positioned opposite to and adapted to close the entrance to the other valve chamber, a valve stem for each valve, a single lever coacting with said valve stems for opening said valves, and independent spring means associated with each valve for closing said valve upon release of said lever.

14. A valve assembly for controlling the admission of fluids to a mixer, said valve assembly comprising a body having two valve chambers formed therein, a valve comprising a diaphragm in each valve chamber, a seating portion of resilient material integral with each diaphragm, the seating portion of one diaphragm being positioned opposite to and adapted to close the exit from one valve chamber and the seating portion of the other valve being positioned opposite to and adapted to close the entrance to the other valve chamber, a metering plug in the outlet of the valve chamber against which a seating portion closes, a valve stem for each valve, a single lever coacting with said valve stems for opening said valves, and independent spring means associated with each valve for closing said valve upon release of said lever.

15. In a blowpipe, a valve assembly, a cutting oxygen valve in said valve assembly for admitting cutting oxygen to a passage of the blowpipe, heating oxygen and fuel gas throttle valves in said valve assembly for controlling flow of the respective gases to blowpipe passages, and shutoff valves for heating oxygen and fuel gas also in said valve assembly, said shutoff valves being adapted to exclude or admit the respective gases to the blowpipe passages.

16. In a blowpipe, a handle, throttle valves controlling admission of heating oxygen and fuel gas to the blowpipe passages, a valve controlling the flow of cutting oxygen through the blowpipe, shutoff valves for heating oxygen and fuel gas adapted to exclude or admit the respective gases to the blowpipe passages, means on one side of said handle for operating said cutting oxygen valve, and means on the other side of said handle to operate said shutoff valves.

17. In a blowpipe, a handle, a valve assembly at one end of said handle, a cutting oxygen valve in said valve assembly for admitting cutting oxygen to a passage of the blowpipe, control valves in said valve assembly controlling the admission of heating oxygen and fuel gas to the blowpipe passages, shutoff valves for the heating oxygen and fuel gas also in the valve assembly, said shutoff valves being adapted to exclude or admit the respective gases to the blowpipe passages, and means on one side of said handle to operate said shutoff valves.

JAMES H. BUCKNAM.